United States Patent [19]
Campbell et al.

[11] Patent Number: 5,671,281
[45] Date of Patent: Sep. 23, 1997

[54] SELF MODIFYING ACCESS CODE FOR ALTERING CAPABILITIES

[75] Inventors: John Edward Campbell, Hurley, N.Y.; Michael James Chan, Raleigh, N.C.; Steven Frank Hajek, West Hurley; Paul Leonard Wiltgen, Hurley, both of N.Y.

[73] Assignee: International Business Machines Corporation, Armonk, N.Y.

[21] Appl. No.: 288,100

[22] Filed: Aug. 10, 1994

Related U.S. Application Data

[63] Continuation of Ser. No. 85,216, Jun. 30, 1993, Pat. No. 5,365,587, which is a continuation-in-part of Ser. No. 29,856, Mar. 11, 1993, abandoned.

[51] Int. Cl.$^6$ .................. H04L 9/32; H04L 9/00
[52] U.S. Cl. .................. 380/25; 380/4; 380/23; 380/49; 380/50; 340/825.31; 340/825.34
[58] Field of Search .................. 380/4, 23, 24, 380/25, 46, 48, 49, 50; 340/825.31, 825.34; 395/821, 823, 825, 856, 309, 866; 364/405

[56] References Cited

U.S. PATENT DOCUMENTS

| | | | |
|---|---|---|---|
| 3,245,045 | 4/1966 | Randlev | 395/866 |
| 4,100,534 | 7/1978 | Shifflet, Jr. | 340/825.31 |
| 4,430,702 | 2/1984 | Schiebe et al. | 395/309 |
| 4,532,507 | 7/1985 | Edson et al. | 340/825.31 |
| 4,599,489 | 7/1986 | Cargile | 380/4 |
| 4,651,279 | 3/1987 | Suzuki | 364/405 |
| 4,800,590 | 1/1989 | Vaughan | 380/25 |
| 4,942,606 | 7/1990 | Kaiser et al. | 380/4 |
| 5,018,096 | 5/1991 | Aoyama | 340/825.34 |
| 5,060,263 | 10/1991 | Bosen et al. | 380/25 |
| 5,151,938 | 9/1992 | Griffin, III et al. | 380/25 X |
| 5,182,770 | 1/1993 | Medveczky et al. | 380/4 |

OTHER PUBLICATIONS

R.A. Dayan et al.; "Single In–Line Memory Module Identification Method for Personal Computers"; IBM Technical Disclosure Bulletin, vol. 36, No. 9A, pp. 31–32.

J.M. Angiulli et al.; "Automatic Upgrade of Customer OP System Order"; IBM Technical Disclosure Bulletin, vol. 36, No. 8, Aug. 1993, pp. 7–8.

R. C. Eng. et al.; "Adaptable Initialization for Highly Configurable Personal Computer Systems"; IBM Technical Disclosure Bulletin No. 1, Jan. 1993, pp. 182–183.

*Primary Examiner*—Bernarr E. Gregory
*Attorney, Agent, or Firm*—Whitham, Curtis, Whitham & McGinn; Lynn L. Augspurger

[57] ABSTRACT

A system is disclosed for selectively altering the functional characteristics of a data processing system without physical or mechanical manipulation by providing an access code from a remote personal identification number generator to a secure controller and store of the computer system. This enables remote authorization of change in function of the computer system, such as performance tune up, speeding clock time, changing function and like changes. The computer system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolitile memory into a nonscannable register within a secure portion of a control logic circuit each time power is applied to the data processing system and the definition is then utilized to enable only selected functional characteristics. Alternate functional characteristics may thereafter be selectively enabled by entering a security code which matches one of a number of preloaded codes and an encoded alternate functional characteristic definition. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

36 Claims, 12 Drawing Sheets

SELF MODIFYING ACCESS CODE FOR ALTERING CAPABILITIES

CROSS REFERENCE TO RELATED APPLICATIONS

This is a continuation of application Ser. No. 08/085,216, filed Jun. 30, 1993 now U.S. Pat. No. 5,365,587, which is a continuation-in-part of application Ser. No. 029,856, filed Mar. 11, 1993, now abandoned, entitled "Method and System for Selectively Altering Data Processing System Functional Characteristics Without Mechanical Manipulation."

FIELD OF THE INVENTION

This invention is related to computers and computer systems and particularly to computer functions controlled from a remote location.

GLOSSARY OF TERMS

| | |
|---|---|
| DES | A kind of cryptographic algorithm. |
| PIN | ACCESS CODE used as a security code. |

BACKGROUND OF THE INVENTION

As background for our invention, there have been for many years password generators for a PIN. PINs have been used to gain access to automated tellers and security areas when unattended operation and/or verification of authorization is desired. They have been used for granting access to computers, as illustrated by U.S. Pat. No. 4,799,258 to Davies et al granted Jan. 17, 1989. PINS may be generated automatically, and may be generated by random number generators or pseudo-random number sequences stored in the memory of a computer. U.S. Pat. No. 4,800,590 to James C. Vaughan illustrates a password generating device for generating passwords, and a computer access system based upon the generated secure number based on time such that the algorithm is valid, only over a 3 minute window. However, the lock or unlock of a computer system, e.g., the host computer of Vaughan does not satisfy needs which are now possible to achieve. It is dissimilar in that it doesn't deal with repetitive modification of machine function and permits a range of numbers that can be matches instead of one unique number.

Many methods exist for granting or revoking a user's access to selected facilities or files within a data processing system. These techniques often utilize a secret "key" or "password" entered by a user and recognized within the data processing system as an indication of the user's ability to read, write, delete, copy or append a selected record. One example of such a system is disclosed in U.S. Pat. No. 4,799,258.

Further, several known techniques exist for storing such "keys," "passwords" or other secure data within secure storage devices within a data processing system. For example, U.S. Pat. No. 4,949,927 discloses a method for providing a security module for physically protecting such sensitive data. Similarly, U.S. Pat. No. 4,759,062 discloses a method for protecting sensitive data, such as private security codes.

Each of the methods described above permits the storage and utilization of sensitive or private data; however, none of these publications teaches a technique whereby the functional characteristics of a data processing system may be selectively altered. Systems do exist for enabling or disabling electronic equipment utilizing "keys" or other similar devices. Primarily such systems are directed to enabling or disabling reception of television or CATV signals within a television receiver. For example, see U.S. Pat. Nos. 4,577,224 and 4,471,379.

In summary, many systems exist which permit selected users to access and manipulate particular files within a data processing system or which enable or disable a selected electronic system; however, no known systems exist which permit the functional characteristics of a data processing system to be selectively modified without the necessity of physical or mechanical manipulation.

SUMMARY OF THE INVENTION

The present invention deals with the use of secure access code generation that permits repetitive modification of machine function and permits a range of numbers that can be matches instead of one unique number. We have achieved a way of modification of a computer function an unlimited number of times with each such modification accompanied by a unique access code PIN. Such a mechanism permits, as an example, a computer leasing operation to schedule and modify the performance of the machine at various intervals or to permit access to certain other function for various periods of times as needed by their customers.

Using a method and system to selectively alter the functional characteristics of a data processing system without physical or mechanical manipulation, our preferred computer system is manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from non-volatile memory into a nonscannable register within a secure portion of a control logic circuit each time power is applied to the data processing system and the definition is then utilized to enable only selected functional characteristics. Alternate functional characteristics may thereafter be selectively enabled by entering a security code which matches one of a number of preloaded codes and an encoded alternate functional characteristic definition. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

The improvements which we have made achieve the security of ownership of the control of functions within a computer system and an inexpensive technique for unlimited alterations to the functional capability of the computer system. These improvements are accomplished by providing a secure function transmitter 301 controlling 309 a remote computer system 302. The secure control generator 303 creates a unique access number PIN accompanying a control message sent to the computer system. While security for the control generator is accomplished by ordinary techniques, security for the secure control 307 within the computer system is provided by providing a secure nonvolatile store within the data processing system with a multibit alterable code stored therein. The secure control 307 compares the PIN and enables the function 308 if permitted by the PIN.

The foregoing and other objects, aspects, and advantages will be better understood from the following description of preferred embodiments of the invention with reference to the drawings.

DETAILED DESCRIPTION OF THE INVENTION

The invention can be better understood by summarizing an example of its operation before describing the details of its various embodiments. As an example, assume that a computer system is rented to a customer by a supplier. The computer system has the capability of executing a million instructions in one second but the customer wishes to pay for less performance, say five hundred instructions per second. The supplier will encode a PIN number that will match the PIN number that is expected by the computer system and sends a message to the computer system that it is to run at one half speed. The computer system upon receiving the PIN sets the new speed into the machine. Later in the month, an unexpected situation arises and the customer needs full performance for two days. The customer orders the two days of performance at one million instructions in one second. The supplier transmits the new PIN number and the message to run at full speed. Two days later, the supplier transmits a new PIN and restores the half speed. Security for the transactions is guaranteed by the one time use of the PIN to change the performance. The security of the PIN number generation is due to the fact that the data algorithm is contained within the secure area of the computer and the secure area of the supplier.

The Preferred Embodiment

Figure 8:
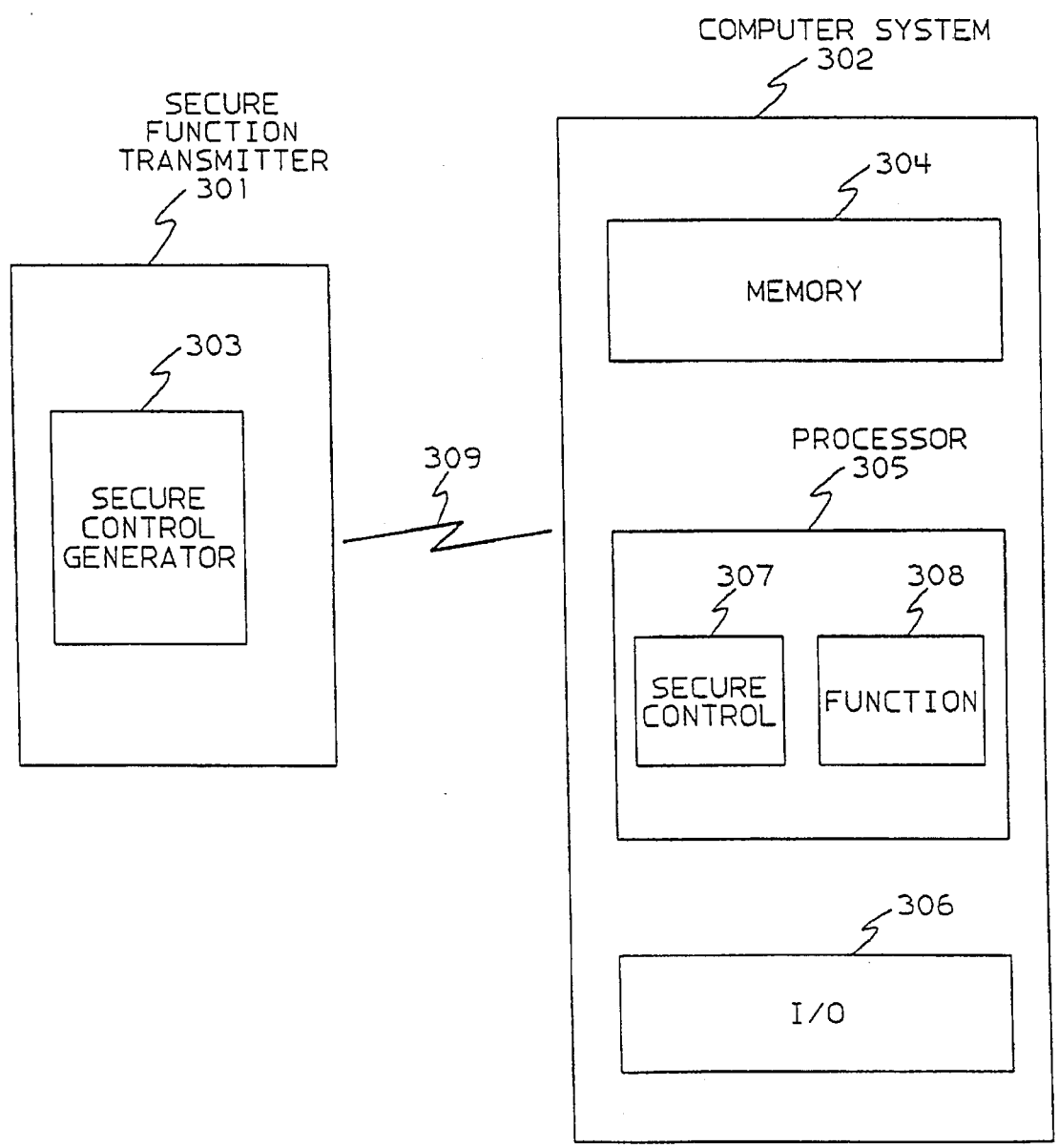
FIG. 8 shows schematically an overview of the preferred embodiment of our invention.

Turning now to our invention in greater detail, it will be seen that FIG. 8 illustrates generally a secure function transmitter 301 controlling via a data link 309 a remote computer system 302. The secure control generator 303 creates a unique access number PIN accompanying a control message sent to the computer system. While security for the control generator is accomplished by ordinary techniques, security for the secure control 307 within the computer system is provided by providing a secure nonvolatile store within the data processing system with a multibit alterable code stored therein. The secure control 307 compares the PIN and enables the function 308 if permitted by the PIN.

Figure 1:
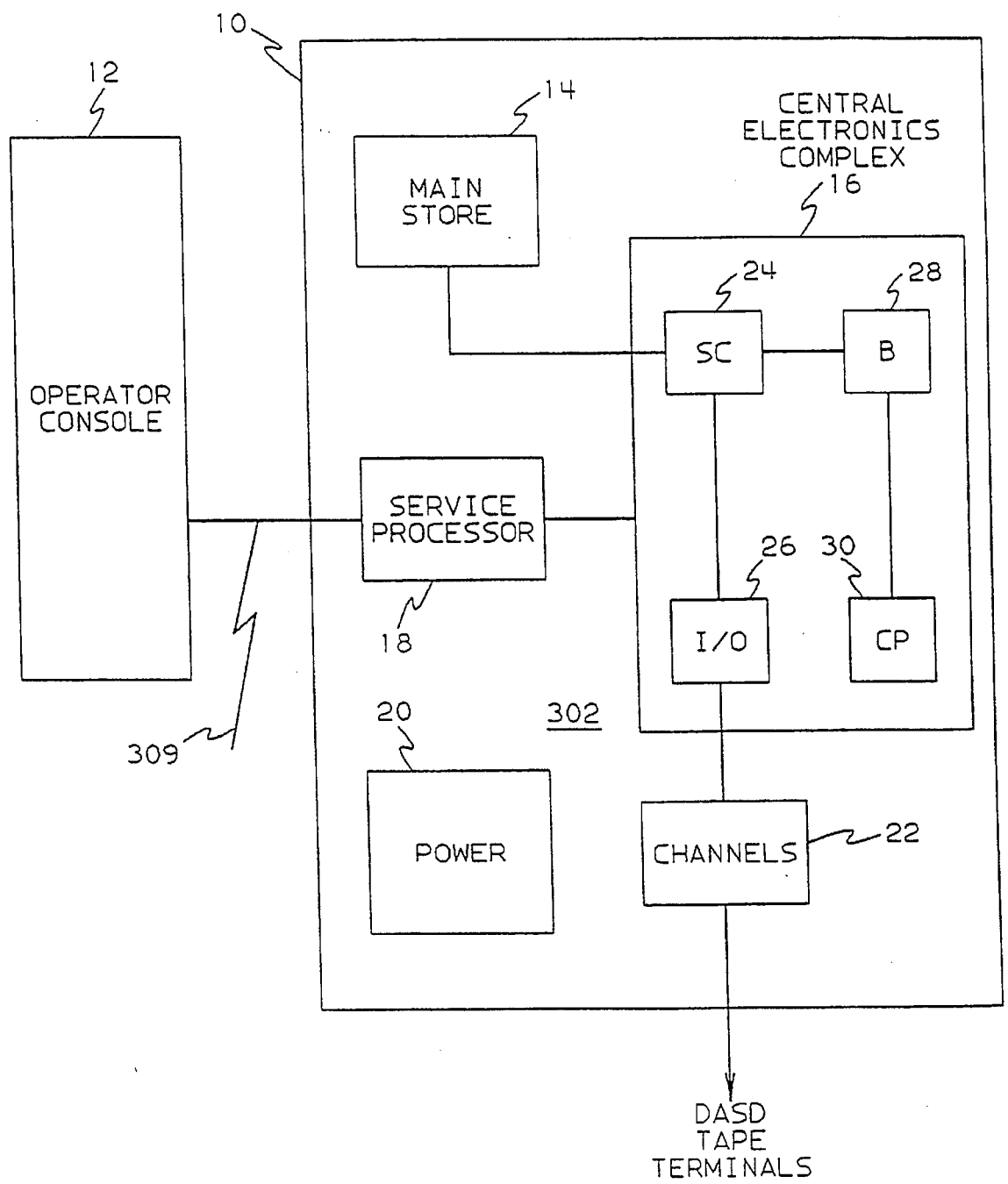
FIG. 1 is a high level block diagram of a data processing system which may be utilized to implement the method and system of the present invention.

For an overview of the computer system, the data processing system which can be selectively altered for functional characteristics without physical or mechanical manipulation, refer to FIG. 1. FIG. 1 depicts a high level block diagram of a data processing system which may be utilized to implement the method and system of the present invention. As illustrated, the data processing system includes a computer 302 having a data link 309 and an operator console 12 coupled in a manner well known in the art. Many of the high level components within computer 302 are depicted within FIG. 1, including main store 14, which serves as the main electronic storage within computer 302, and a central electronics complex 16 is also depicted. As will be explained in greater detail herein, central electronics complex 16 may include multiple multichip modules which serve to perform the various functions of the central electronic complex, or alternately, central electronics complex 16 may be provided with a single high density circuit and including integrated circuit devices equivalent to several million transistors.

A service processor 18 is provided and is preferably coupled between operator console 12 and central electronics complex 16 to provide access to the functions and circuitry therein. A power supply 20 and input/output channels 22 are also typically provided in such a computer system, as those skilled in the art will appreciate. Input/output channels 22 are preferably utilized to access various direct access storage devices (DASD), such as diskette or tape storage devices, or printers, terminals or similar devices.

Still referring to FIG. 1, the high level segments of central electronics complex 16 are illustrated. In a modern mainframe computer such as the International Business Machines Corporation System/390 the central electronics complex typically includes four or more multichip modules which serve to address various functions within a central electronics complex. As illustrated within FIG. 1, central electronics complex 16 includes an SC module 24 which preferably serves to buffer and control the flow of data between main store 14, input/output module 26 and the various processors within computer 302. Input/output module 26 preferably serves to control and buffer data between input/output channels 22 and main store 14 in a manner well known in the art. Similarly, B module 28 is provided to buffer and control instructions and data for the processor and CP module 30 serves to execute instructions within computer 302. As those skilled in the art will appreciate, each of these multichip modules 24, 26, 28 and 30 constitutes a highly complex electronic module which may include more than one hundred integrated circuit devices, each equivalent to thousands or millions of transistors.

Figure 2:
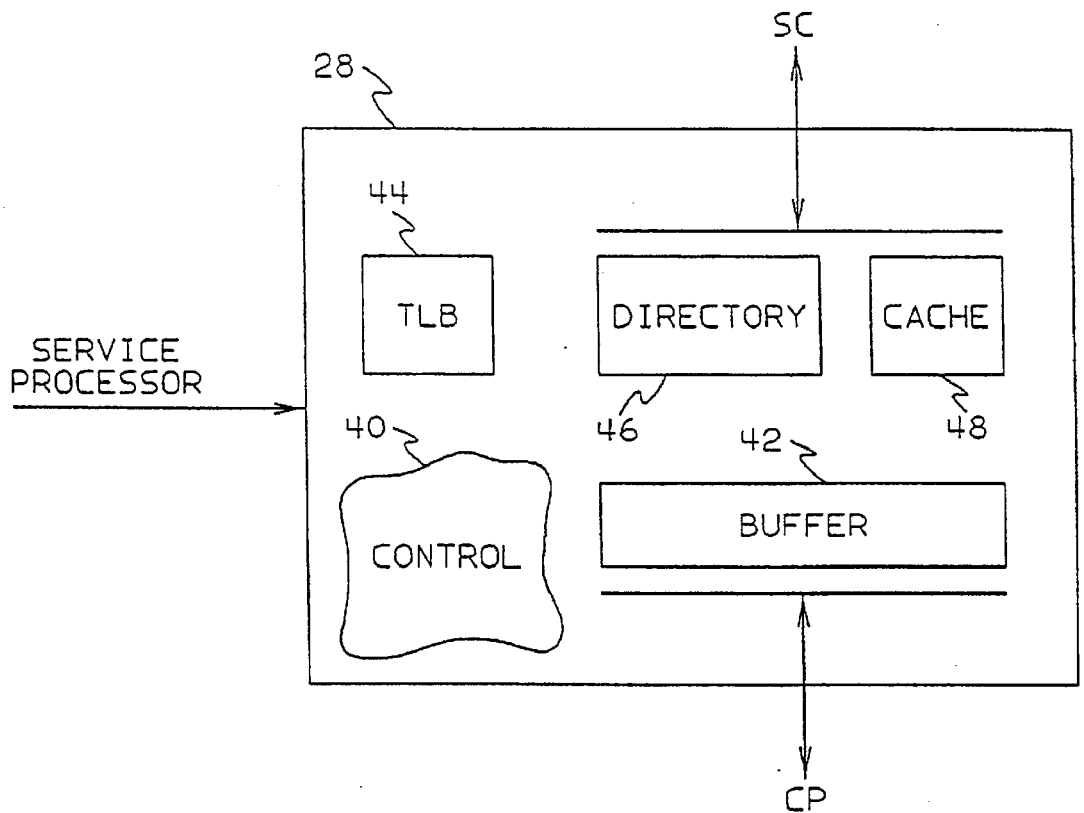
FIG. 2 is a high level schematic representation of one multichip module from the central electronic complex of the data processing system of FIG. 1.

With reference now to FIG. 2, there is depicted a high level schematic representation of one multichip module from central electronics complex 16 of FIG. 1. As illustrated, B module 28 is illustrated along with several of its high level components. For example, a large portion of B module 28 is depicted generally at reference numeral 40, which represents the various control functions implemented within this multichip module. A buffer 42 is preferably provided to buffer instructions and data from CP module 30 and a directory 46 and cache 48 are also typically provided to buffer and control data between B module 28 and SC module 24.

Additionally, as those skilled in this art will appreciate, a translation lookaside buffer (TLB) 44 is also provided and is utilized, in a manner well known in the art, to translate virtual memory addresses into real memory addresses within main store or other locations within computer 302. Thus, it should be apparent that the functional characteristics of computer 302 may be altered and controlled by varying the capabilities and circuitry of B module 28; however, the complexity required to manufacture and maintain multiple varieties of B module 28 would be greatly diminished if the functional characteristics associated with this multichip module might be electronically manipulated.

Figure 3:
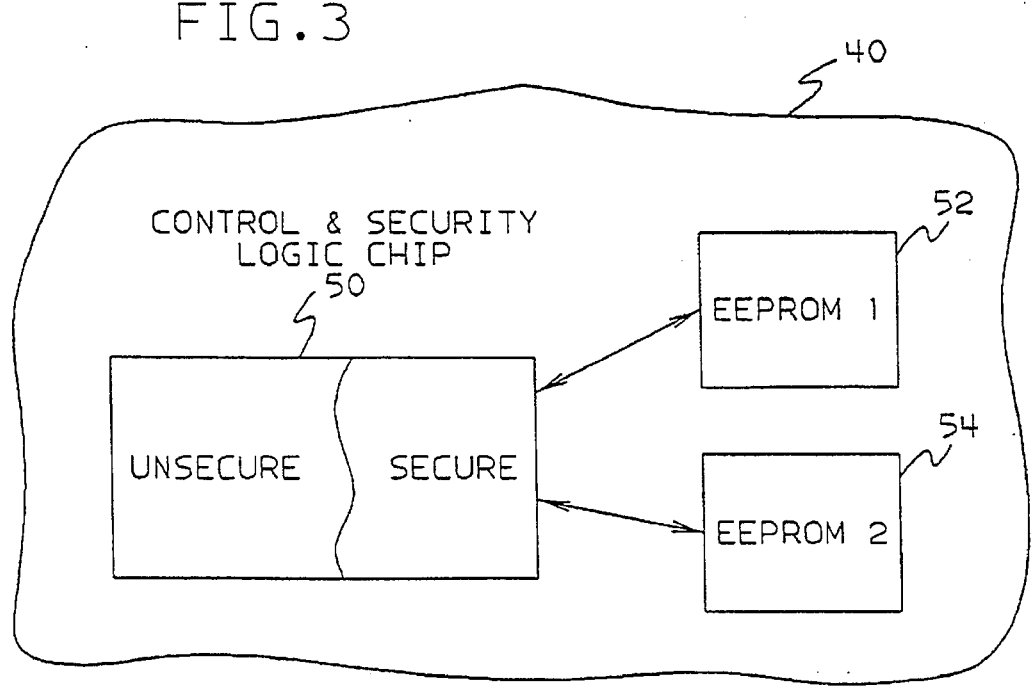
FIG. 3 is a high level schematic representation of the control and security logic circuitry which may be utilized within the multichip module of FIG. 2 to implement the method and system of the present invention.

With reference now to FIG. 3 there is depicted a high level schematic representation of a portion of the control and security logic circuitry which may be utilized within B module 28 of FIG. 2. As illustrated, control circuitry 40 may be constructed including a control and security logic chip 50 which is coupled to multiple nonvolatile memory storage devices, such as EEPROM 52 and EEPROM 54. In the depicted embodiment of the present invention control and security logic chip 50 preferably includes both an unsecure and a secure portion. In a manner which will be described in greater detail herein, a personality register may be established within the secure portion of control and security logic chip 50 and utilized to store data which has been retrieved from EEPROM 52 and/or EEPROM 54 to selectively alter the functional characteristics of computer 302.

Figure 4:
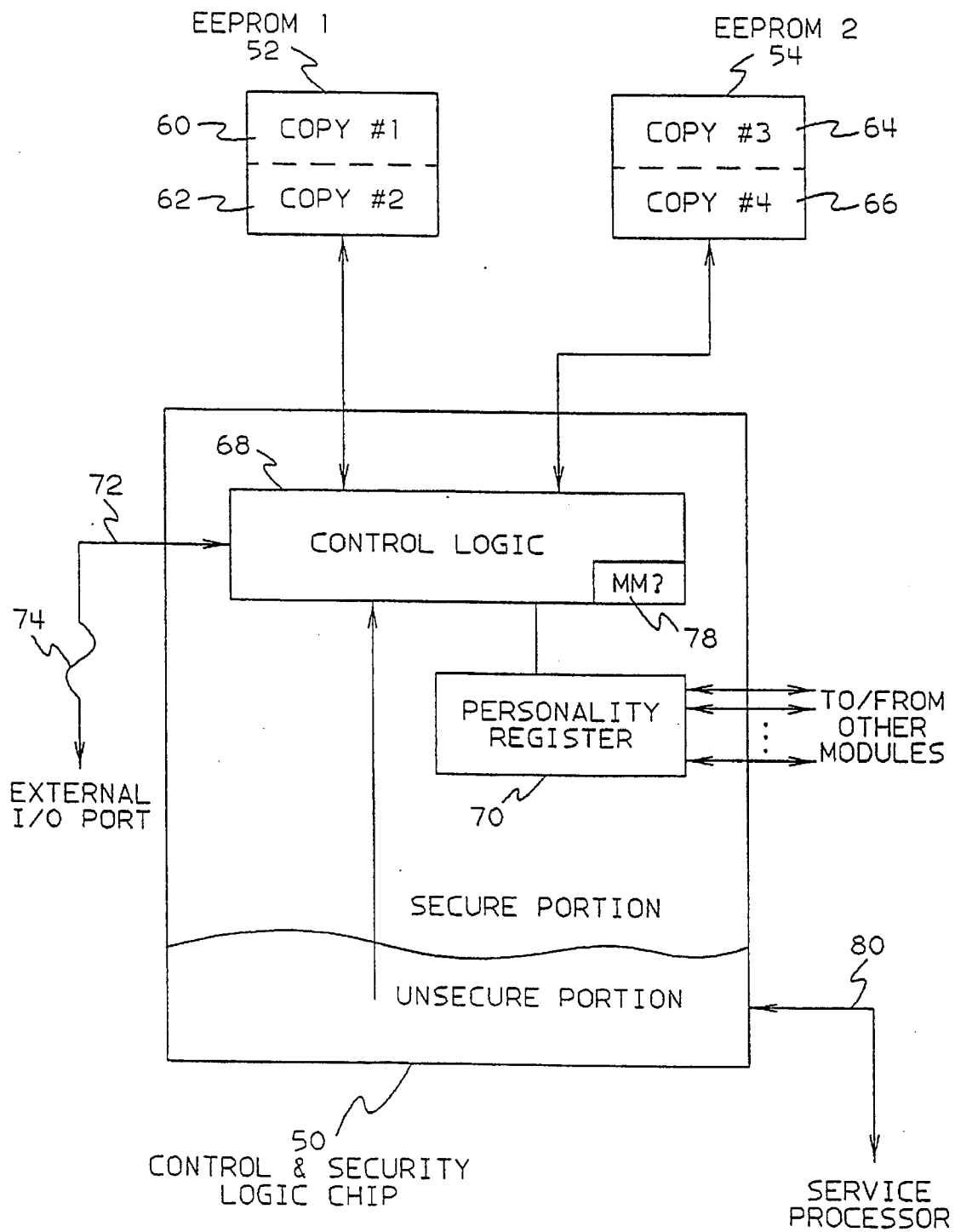
FIG. 4 is a more detailed schematic representation of the control and logic circuitry of FIG. 3.

Referring now to FIG. 4, there is depicted a more detailed schematic representation of the control and logic circuitry of FIG. 3. As illustrated, control and security logic chip 50 includes both an unsecure portion and a secure portion. Within the secure portion of control and security logic chip 50 control logic 68 is provided. Control logic 68 is preferably coupled to both EEPROM 52 and EEPROM 54 which contain, in a manner which will be explained in greater detail herein, various multibit alterable codes which may be utilized to selectively alter the functional characteristics of computer 302. In the depicted embodiment of the present invention, multiple copies of this multibit alterable code are provided within multiple nonvolatile storage devices in order to minimize the possibility of disruption due to failure. As illustrated, EEPROM 52 includes two identical copies of the multibit alterable code, which may be utilized to selectively control the functional characteristics of computer 302. Similarly, two addition I identical copies of this code are contained within EEPROM 54.

In the depicted embodiment of the present invention, each multibit alterable code includes various fields of data. For example, a model number field may be provided and utilized to store an identification of the model number of computer 302. Additionally, in the illustrated embodiment of the present invention, multiple unique identification codes are also provided. In one implementation of the present invention, six different fifty-six bit identification codes are provided within each copy of the multibit alterable code contained within EEPROM 52 and EEPROM 54. These unique identification codes will be utilized in a manner which will be explained in greater detail below. Additionally, selected "personality" data are also present within each copy of the multibit alterable code within EEPROM 52 and EEPROM 54, which may be utilized to specify the selected functional characteristics of computer 302.

As those skilled in the art will appreciate, mainframe computers such as the International Business Machines Corporation System/390 may include multiple levels of functional capability which may be provided by varying the range of memory that may be accessed within a particular computer system, the number or percentage of processors which are enabled within a particular computer, the amount of usable cache memory within a particular computer and the processor speed and/or capability provided within a particular computer. Thus, by providing computer 302 with the capability of all of these functional characteristics during the manufacturing process, a selected subset or variations of those functional characteristics may be enabled utilizing the method and system of the present invention.

In a manner which will be illustrated below, the initial loading of the multiple copies of the multibit alterable code within EEPROM 52 and EEPROM 54 may be accomplished utilizing several different techniques. For example, an external I/O port 72 is provided and may be utilized to directly load multiple copies of the multibit alterable code into EEPROM 52 and EEPROM 54 during the manufacturing process. Thereafter, a fusible link, such as fusible link 74, may be opened, prohibiting the loading of altered multibit codes utilizing the external I/O port 72. Alternately, the initial loading of the multibit alterable code or variations thereto may be accomplished utilizing the service processor, via bus 80, through the unsecure portion of control and security logic chip 50. As will be explained in greater detail herein, this may be accomplished by requiring a user to enter codes matching two of the six unique identification codes contained within each copy of the multibit alterable code and thereafter setting a manufacturing mode (MM) bit 78 within control logic 68. When this bit is set, control logic 68 will permit alterations to the multibit alterable code within EEPROM 52 and EEPROM 54 to be accomplished.

As set forth above, external I/O port 72, in conjunction with fusible link 74, may be utilized to permit access to secure logic for manufacturing tests, as well as initialization of "blank" EEPROMs mounted within a multichip module. The provision of external I/O port 72 and fusible link 74 is typically required due to the fact that EEPROMs which are initialized prior to mounting within a multichip module often loose their initial values during the manufacturing process. Additionally, exhaustive testing of the secure logic is typically required in order to assure proper operation of the data processing system. Thus, there are, in accordance with the depicted embodiment of the present invention, three methods for initializing the EEPROMs. Firstly, external I/O port 72 and fusible link 74 may be utilized in a system to initialize the nonvolatile storage by means of a service processor. Secondly, external I/O port 72 and fusible link 74 may be utilized in a test bed via scan or via EEPROM redriven logic through the logic circuitry, and third, the EEPROMs may be initialized by presetting the manufacturing mode (MM) bit 78 during the manufacturing process.

Having loaded multiple copies of a multibit alterable code within EEPROM 52 and EEPROM 54 within computer 302, control logic 68 then obtains the so-called "personality" data from one copy of the multibit alterable code and loads that information into a nonscannable personality register 70 within the secure portion of control and security logic chip 50. Personality register 70 is preferably utilized to maintain the current personality data stored within the multibit alterable code in a manner such that other modules or chips within computer 302 may access that information and determine whether or not selected functional characteristics within computer 302 are enabled and presently being utilized.

The schematic representation within FIG. 4 is a relatively high level representation and those skilled in the art will appreciate that additional control logic circuitry may also be utilized. For example, a status register is preferably provided which is utilized to store the number of access attempts which have occurred since a successful loading or alteration of the multibit alterable code. In a manner well known to those having skill in the security data art, the number of such attempts may be limited to a relatively small number of attempted accesses and an attempted access or alteration of that data which exceeds this preselected limit may be utilized to place computer 10 within a default or lockout mode, prohibiting further attempts to modify the functional characteristics of the computer. Additionally, a log area is preferably provided within EEPROM 52 and EEPROM 54, which may be utilized to store various data entered therein, without requiring unique identification codes. For example, various maintenance and modification data may be stored therein. Upon reference to the foregoing, those skilled in the art will appreciate that the method and system described herein will permit a manufacturer to manufacture a computer system which includes a full set of predetermined functional characteristics and thereafter the control and security logic circuitry described herein may be utilized to selectively enable a subset of those functional characteristics for a particular application.

Figure 5:
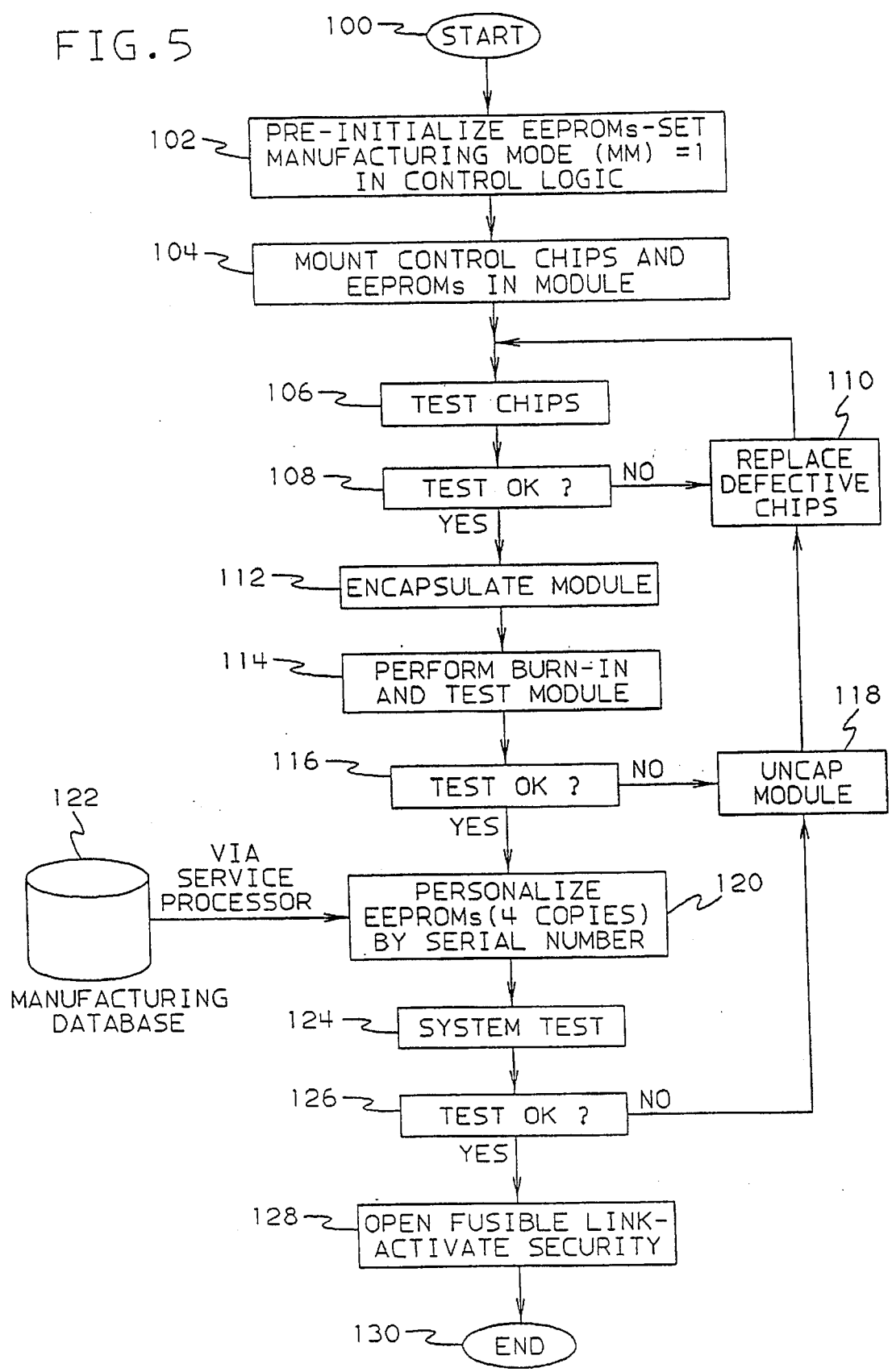
FIG. 5 is a high level logic flowchart depicting a manufacturing process for creating a data processing system which may be utilized to implement the method and system of the present invention.

With reference now to FIG. 5, there is depicted a high level logic flowchart which illustrates a manufacturing process for creating a data processing system which may be utilized to implement the method and system of the present invention. As illustrated, this process begins at block 100 and thereafter passes to block 102. Block 102 illustrates the preinitialization of the EEPROMs and the setting of the manufacturing mode (MM) bit to "1" within control logic 68 (see FIG. 4). Of course, as described above, the setting of the manufacturing mode (MM) bit to "1" within control logic 68 will not be necessary if the EEPROMs are initialized utilizing external I/O port 72 and fusible link 74, as described above. Thereafter, the process passes to block 104. Block 104 illustrates the mounting of the control chips and EEPROMs within a multichip module. While the illustrated embodiment depicted herein shows the mounting of the control and security logic chip within B module 28, those skilled in the art will appreciate that this method and system may be utilized within any multichip module within the central electronics complex, or directly within the central electronics complex in systems which do not utilize multichip modules. Next, the process passes to block 106. Block 106 illustrates the testing of the mounted chips. Thereafter, as depicted within block 108, if the mounted chips do not satisfactorily test, the process passes to block 110 which illustrates the replacing of the defective chips and the process then returns, in an iterative fashion, to block 106.

In the event the mounted control chips and EEPROMs test satisfactorily, the process passes from block 108 to block 112. Block 112 illustrates the encapsulation of the multichip module containing the control chips and EEPROMs. Those skilled in the art will appreciate that this encapsulation process may be accomplished utilizing any well known encapsulation technique which provides physical security for the integrated circuits mounted within such a module. Thereafter, the process passes to block 114. Block 114 illustrates the performing of so-called "burn-in" and the testing of the module. Next, the process passes to block 116 which illustrates a determination of whether or not the test was satisfactorily completed. If not, the process passes to block 118 which illustrates the uncapping of the multichip module and the process then returns iteratively to block 110, which depicts the replacing of the defective chips. The process then repeats until such time as the control chips and EEPROMs have been successfully mounted, burn-in has been performed and a test has been satisfactorily completed.

Still referring to block 116, in the event the test has been completed satisfactorily, the process passes to block 120. Block 120 illustrates the personalization of the EEPROM chips in association with a serial number assigned to each module. This may be accomplished via the service processor from a manufacturing database 122. Those skilled in the art will appreciate that it will be necessary to maintain, within manufacturing database 122, a record of the serial number and unique identification codes assigned to each module manufactured utilizing this technique, such that service personnel may alter the selected functional characteristics of the computer which utilizes these modules by matching the unique identification numbers stored therein, during that process. Additionally, as described above, the manufacturing database may accomplish this process utilizing an external I/O port and fusible link, such as that described within FIG. 4.

After the EEPROM chips within a multichip module have been customized, the process passes to block 124. Block 124 illustrates the performance of a system test, and the process then passes to block 126. Block 126 depicts a determination of whether or not the system test was completed satisfactorily and if not, the process returns to block 118 in an iterative fashion, and proceeds as described above. Still referring to block 126, in the event the system test is concluded satisfactorily, the process passes to block 128. Block 128 illustrates the opening of the fusible link (see FIG. 4) and the activation of security within control logic 68. Thereafter, the process passes to block 130 and terminates.

Figure 6:
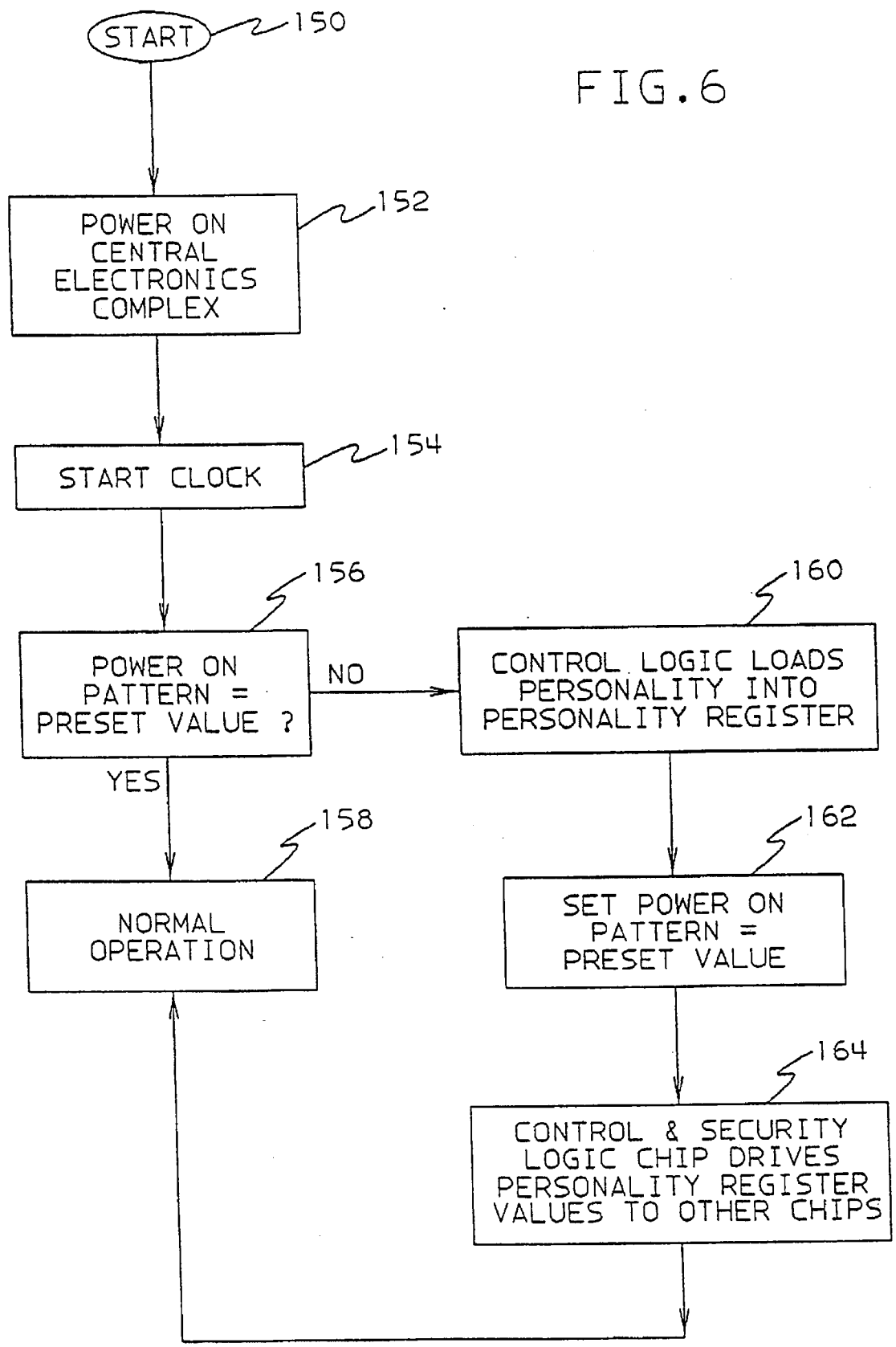
FIG. 6 is a high level logic flow chart which illustrates the enablement of selected functional characteristics within a data processing system in response to the application of electrical power, in accordance with the method and system of the present invention.

Referring now to FIG. 6, there is depicted a high level logic flowchart which illustrates the enablement of selected functional characteristics within a data processing system, in response to the application of electrical power, in accordance with the method and system of the present invention. As depicted, the process begins at block 150 and thereafter passes to block 152 which illustrates the powering on of the central electronics complex. Thereafter, the process passes to block 154 which illustrates the starting of the system clock. Next, the process passes to block 156 which illustrates a determination of whether or not a power on pattern equals a predetermined preset value. This determination is required in order to prohibit the functional characteristics of a data processing system from being altered in an unauthorized fashion by selectively removing power from the central electronics complex. If the power on pattern is equal to the predetermined preset value, the process passes to block 158, which illustrates normal operation of the data processing system.

Still referring to block 156, in the event the power on pattern does not equal the predetermined preset value, the process passes to block 160. Block 160 illustrates the loading of the personality data by control logic 68 into personality register 70 (see FIG. 4). This is accomplished by utilizing control logic 68 to read the personality data from the nonvolatile storage devices implemented utilizing EEPROM 52 and EEPROM 54. Next, the process passes to block 162. Block 162 illustrates the setting of the power on pattern to the predetermined preset value and the process then passes to block 164. Block 164 then illustrates the control and security logic chip driving the personality register values to the other chips within the module, and the process then passes to block 158 which illustrates normal operation.

Upon reference to the foregoing those skilled in the art will appreciate that by providing selected "personality" data within nonvolatile storage devices within a data processing system and accessing that data each time power is applied to the data processing system, the content of a personality register may be controlled which may then be utilized to enable and/or disable various functional characteristics of the data processing system, permitting the manufacturer to provide a variety of functional characteristic capabilities within a single data processing system, without physical or mechanical manipulation.

Figure 7A:
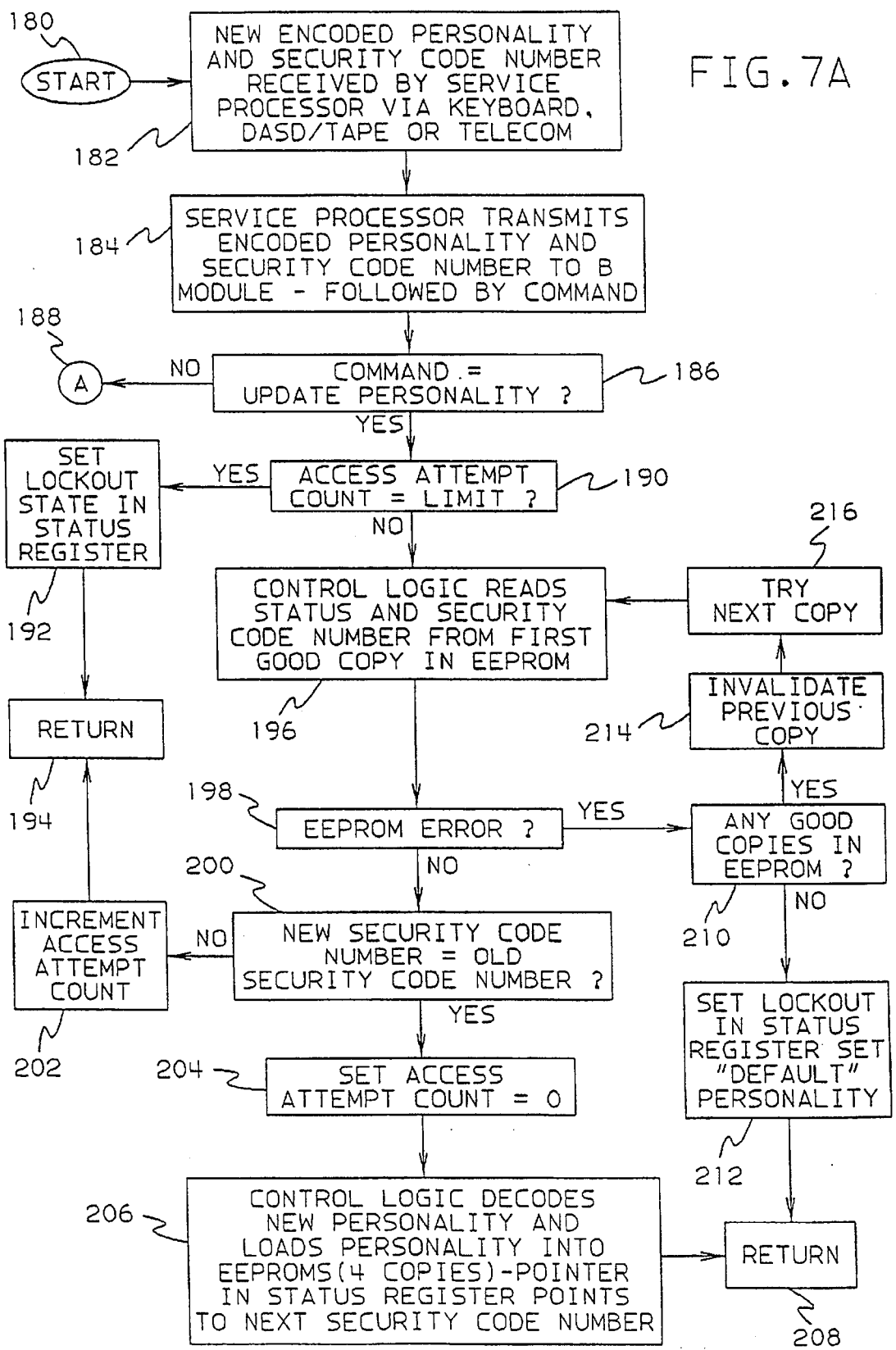
FIGS. 7a and 7b together form a high level logic flowchart which depicts the process of selectively altering the functional characteristics of a data processing system in accordance with the method and system of the present invention.
Figure 7B:
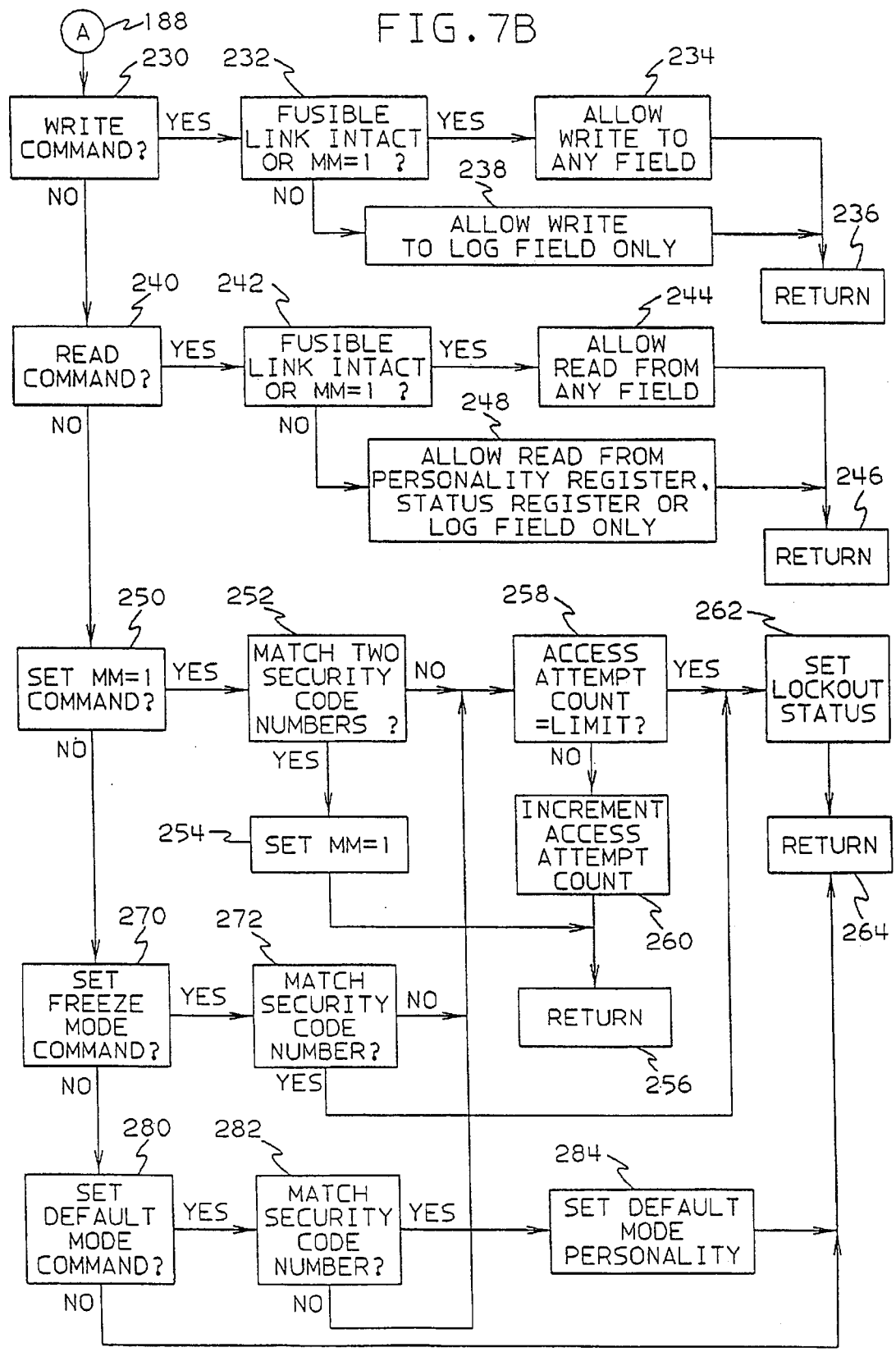

Finally, with reference to FIGS. 7a and 7b, there is depicted a high level logic flowchart which illustrates the process of selectively altering the functional characteristics of a data processing system in accordance with the method and system of the present invention. As depicted, this process begins at block 180 and thereafter passes to block 182. Block 182 illustrates the process whereby a new encoded personality and security code number is received by control logic 68 (see FIG. 4) via the keyboard, direct access storage devices or a telecommunications link. Thereafter, the process passes to block 184. Block 184 illustrates the transmission of the encoded personality and security code number to B module 28, followed by the associated command. Thereafter, block 186 illustrates a determination of whether or not the command transmitted by the service processor is a command to update the "personality," or functional characteristics of the data processing system. If not, the process passes via connector A, at reference numeral 188, to the portion of the process depicted within FIG. 7b, which will be described in greater detail below.

Still referring to block 186, in the event command transmitted by the service processor is a command to update the personality or functional characteristics of the data processing system, the process passes to block 190. Block 190 illustrates a determination of whether or not this attempt to access control logic 68 is equal to the limit of the number of access attempts permitted. If so, the process passes to block 192 which illustrates the setting of the so-called "lockout" state within the status register of control logic 68 and no further attempts to alter the functional characteristics of the data processing system will be permitted. The process then passes to block 194 and returns.

Still referring to block 190, in the event the current access attempt count does not equal the limit on such attempts, the process passes to block 196. Block 196 illustrates the reading of the status and the unique security identification code from the first good copy within the EEPROM chips. The process then passes to block 198, which illustrates a determination of whether or not an error exists within this data. If not, the process passes to block 200.

Block 200 illustrates a determination of whether or not the entered unique security identification code is equal to the existing unique security identification code. If not, the process passes to block 202 which illustrates the incrementing of the access attempt count and the process then passes to block 194 and returns. In this manner, as those skilled in the art will appreciate, an unsuccessful attempt to access the personality data within EEPROM 52 and EEPROM 54 to alter the functional characteristics of the data processing system will not be permitted if the number of attempts exceeds a predetermined small number.

Still referring to block 200, in the event the entered security identification code does match the existing unique security identification code the process passes to block 204. Block 204 illustrates the setting of the access attempt count to zero. Thereafter, the process passes to block 206. Block 206 illustrates the decoding of the new personality data and the loading of that personality data into all four copies of the multibit alterable code within the EEPROM chips. A pointer within a status register is then incremented to point to the next of the six unique security identification codes. Those having skill in this art will appreciate that the particular one of the six unique security identification codes utilized for each such update or alteration will be altered by incrementing this pointer, such that the same unique security identification code may not be utilized twice in succession. Of course, the six unique security identification codes may be reutilized after all six have been utilized by having a pointer within the status register wrap back to the first unique security identification code after the last unique security identification code has been utilized. Alternately, those skilled in the art will appreciate that the unique security identification codes described herein may be self modifying in that after all six unique security identification codes have been utilized the positions of those codes may be altered or scrambled utilizing an algorithm which may be mimicked within the manufacturing database. In yet another embodiment of the present invention a DES algorithm may be utilized to encrypt each unique security identification code in a unique manner for each operation. Thereafter, the process passes to block 208 and returns. In this manner, the subset of enabled functional characteristics within a data processing system may be electronically altered, without the necessity of physical or mechanical manipulation of the data processing system.

Referring back to block 198, in the event an error within the data in the EEPROM chip is detected, the process passes to block 210. Block 210 illustrates a determination of whether or not any "good" copies of this data remains within one of the EEPROM chips. If not, the process passes to block 212, which illustrates the setting of "lockout" in the status register and the assigning of a "default" personality to the data processing system. Thus, in the event the data within the EEPROM chips has been corrupted or is no longer available, a "default" subset of functional characteristics will be selected. Thereafter, the process passes to block 208 and returns.

Still referring to block 210, in the event a "good" copy of the data remains within an EEPROM chip, the process passes to block 214. Block 214 illustrates the invalidation of the previous copy of that data and thereafter, as depicted at block 216, the next copy of the data within one of the EEPROM chips is accessed. Thereafter, the process returns to block 196, in an iterative fashion.

Referring now specifically to FIG. 7b, in the event the command transmitted by the service processor to control logic 68 (see FIG. 4) is not an update personality command, the process passes via connector A, at reference numeral 188, to block 230. Block 230 illustrates a determination of whether or not the command transmitted from the service processor is a "write" command. If so, the process passes to block 232. Block 232 illustrates a determination of whether or not fusible link 74 is intact or the manufacturing mode bit (MM) 78 is set (see FIG. 4). If so, the process passes to block 234 which illustrates the permitting of the user to write to any field within the control and security logic. Thereafter, the process passes to block 236 and returns. Alternately, referring to block 232, in the event the fusible link is not intact or the manufacturing mode (MM) bit is not set, the process passes to block 238. Block 238 illustrates the allowing of the user to write to the log field only within the EEPROM chips. Thereafter, the process passes to block 236 and returns.

Referring again to block 230, in the event the command received is not a "write" command, the process passes to block 240. In a similar fashion to that described above, block 240 illustrates a determination of whether or the received command is a "read" command. If so, the process passes to block 242 to once again determine the status of the fusible link and the manufacturing mode bit. In the event the fusible link is intact or the manufacturing mode (MM) bit is set, the process passes to block 244, which illustrates allowing the user to read from any field within the control and security logic. Thereafter, the process passes to block 246 and returns. Still referring to block 242, in the event the fusible link is not intact or the manufacturing mode (MM) bit is not set, the process passes to block 248. Block 248 illustrates the allowing of the user to read from the personality register, status register or log fields only. In this manner a user may determine the enabled status of functional characteristics within a particular data processing system but may not access the unique security identification codes contained therein. Thereafter, the process passes to block 246 and returns.

Referring again to block 240, in the event the command transmitted by the service processor is not a "read" command, the process passes to block 250. Block 250 illustrates a determination of whether or not the command transmitted by the service processor is a command to set the manufacturing mode (MM) bit equal to "1." If so, the process passes to block 252. Block 252 illustrates a determination of whether or not the user has entered two unique security identification code numbers. Those skilled in the art will appreciate that when operating in the manufacturing mode the functional characteristics of the data processing system may be simply and easily changed. Thus, in order to set this mode of operation the method and system of the present invention requires the operator to identically match two fifty-six bit unique security identification codes which were entered into the EEPROM chips during initial loading and stored within the manufacturing database, as described above. If a match occurs with two unique security identification code numbers, as depicted at block 252, the process passes to block 254. Block 254 illustrates the setting of the manufacturing mode and the process then passes to block 256 and returns.

Still referring to block 252, in the event the user has not matched two unique security identification code numbers, the process passes to block 258. Block 258 illustrates a determination of whether or not the access attempt count is equal to the predetermined limit for such attempts. If not, the process passes to block 260 which illustrates the incrementing of the access attempt count and the process then returns, as depicted at block 256. Still referring to block 258, in the event the access attempt count is equal to the predetermined limit, the process passes to block 262. Block 262 illustrates the setting of the "lockout" status and the process then returns, as depicted at block 264.

Referring again to block 250, in the event the command transmitted from the service processor is not a command to set the manufacturing mode, the process passes to block 270. Block 270 illustrates a determination of whether or not the command transmitted by the service processor is a command to set the "freeze" mode. A "freeze" mode, as those skilled in the art will appreciate, may be utilized to lockout further attempts to access the personality data within the control and security logic circuitry such that future attempts to alter or modify the functional characteristics of the data processing system will not be permitted. In the event a "freeze" mode command is received, the process passes to block 272. Block 272 illustrates a determination of whether or not the entered unique security identification code matches the current unique security identification code. If so, the process passes to block 262, which illustrates the setting of the "lockout" status and subsequent return, as depicted at block 264. In the event the entered unique security identification code does not match the current unique security identification code, the process passes to block 258, in an iterative fashion, to determine whether or not this access attempt constitutes an attempt equal to the limit on such attempts and an incrementing of that access attempt count, if the current attempt count does not equal the limit.

Referring again to block 270, in the event the command transmitted by the service processor is not a "freeze" mode command, the process passes to block 280. Block 280 illustrates a determination of whether or not the command transmitted by the service processor is a command to set the default mode. If not, the process merely passes to block 264 and returns. However, in the event the command received is a default mode command, the process passes to block 282. Block 282 illustrates a determination of whether or not the entered unique security identification code matches the current unique security identification code and if so, the process passes to block 284 which illustrates the setting of the default mode personality. However, in the event the entered unique security identification code does not equal the current unique security identification code the process returns iteratively to block 258, to once again determine the current access attempt count and/or increment that count.

Figure 9:
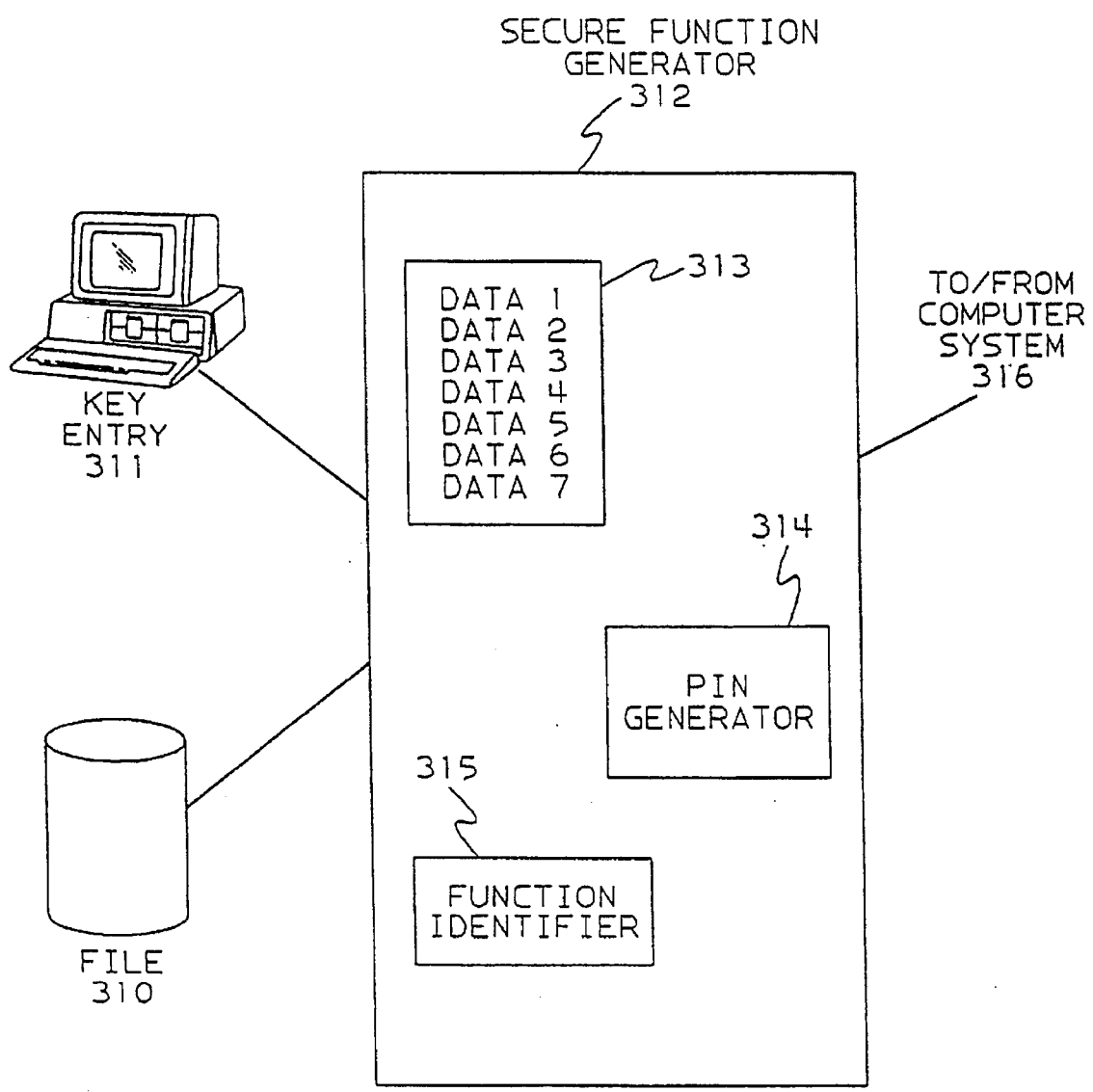
FIG. 9 shows a more detailed view of our secure function transmitter.
Figure 10:
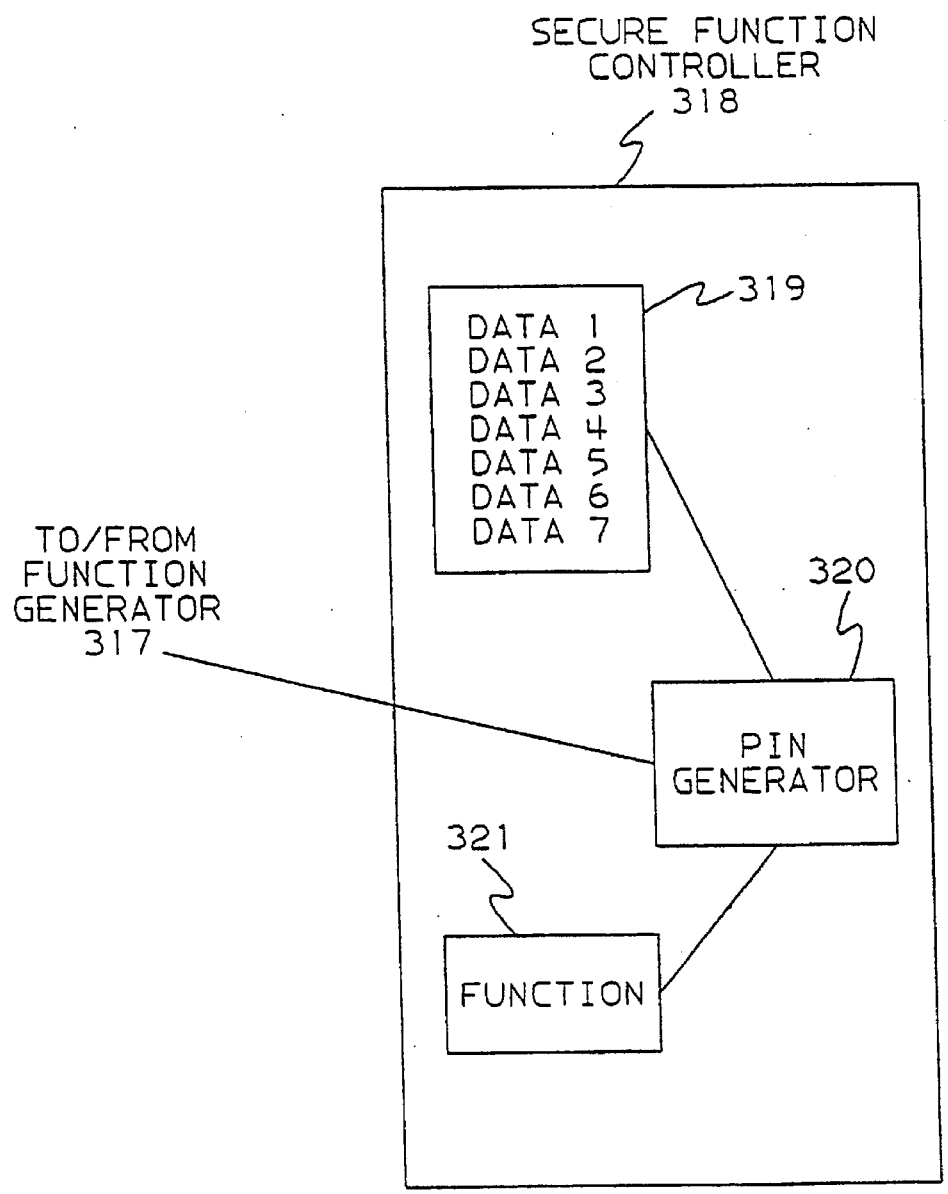
FIG. 10 shows the secure function controller 18 within a computer system.
Figure 11:
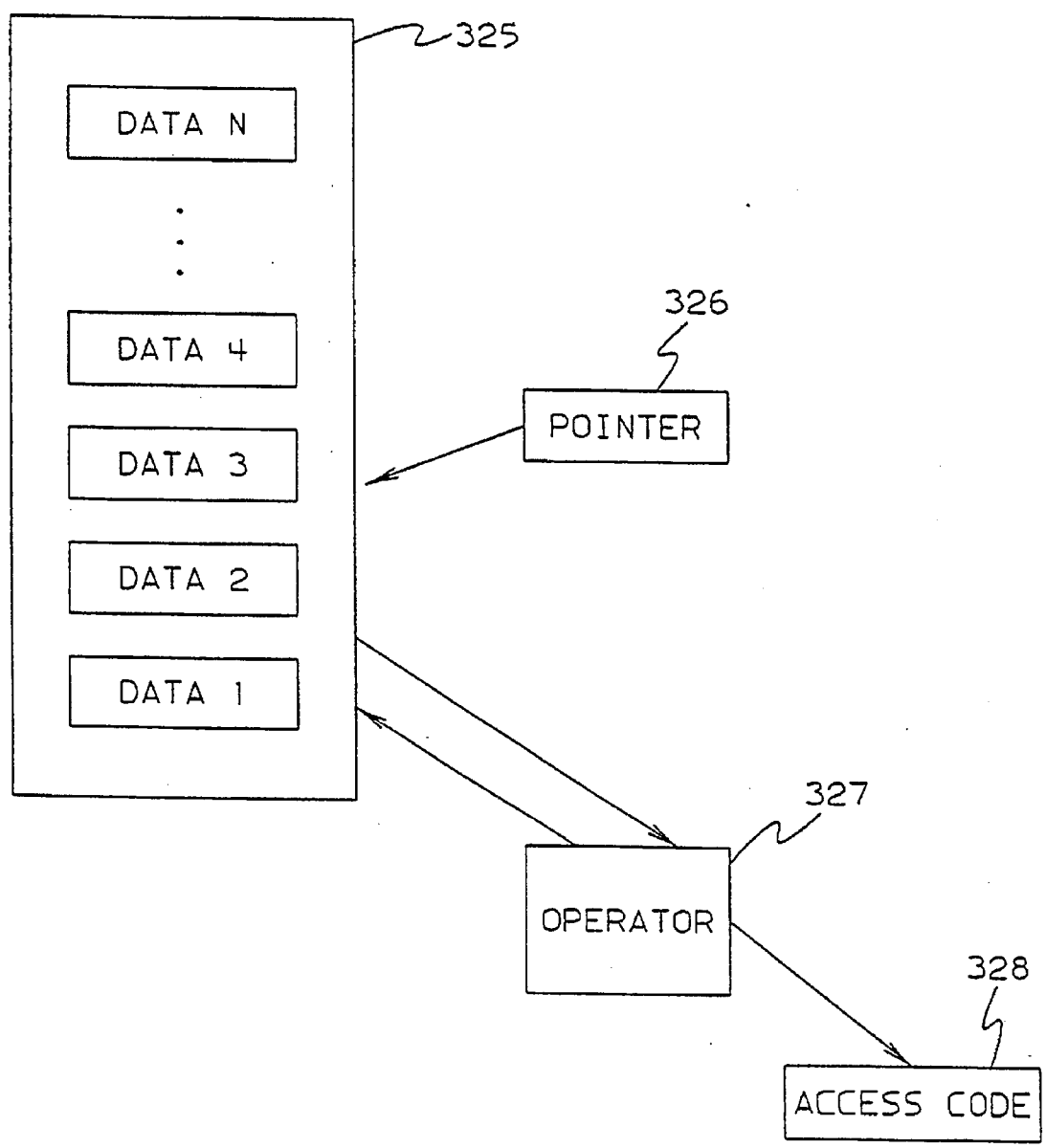
FIG. 11 shows our access code PIN generator.

Returning to our improvement relating to the secure PIN function which is communicated to the forgoing computer system 302, FIG. 8 shows a remote secure function transmitter 301 communicating with the computer system 302 having the significant components described above. The computer system 302 conforms to the processor of FIG. 8 in the preferred embodiment, and has a processor, a memory, a secure control, a function 308, and an I/O port. The secure function transmitter in accordance with our invention has a secure control generator 303 and transmitter for transmission of a generated security signal to the computer system 302 via data link 309 which may be wire, fiber optic, or wireless. FIG. 9 illustrates our secure function transmitter in more detail with attachment to a permanent file 310 and manual entry device 311 as well as the major components of the secure function generator used to create the access code PIN and combine it with the required function 315. FIG. 10 shows the secure function controller 318 within a computer system. It's major components are a communications path from the remote function generator 317 over which a PIN and new function code are passed, a non-volatile data area 319, an access code generator 320 and a function control register 321. FIG. 11 shows our access code PIN generator, within it a secure, non-volatile store 325 such as an EEPROM with N data fields, a pointer to the Nth data field 326, an "operator" 327 responsible for managing the data fields and generating the new access code 328 to be used to validate the new function. A copy of this access code generator is as shown in FIG. 8 both the secure function transmitter 301 and the computer system 302.

Figure 12:
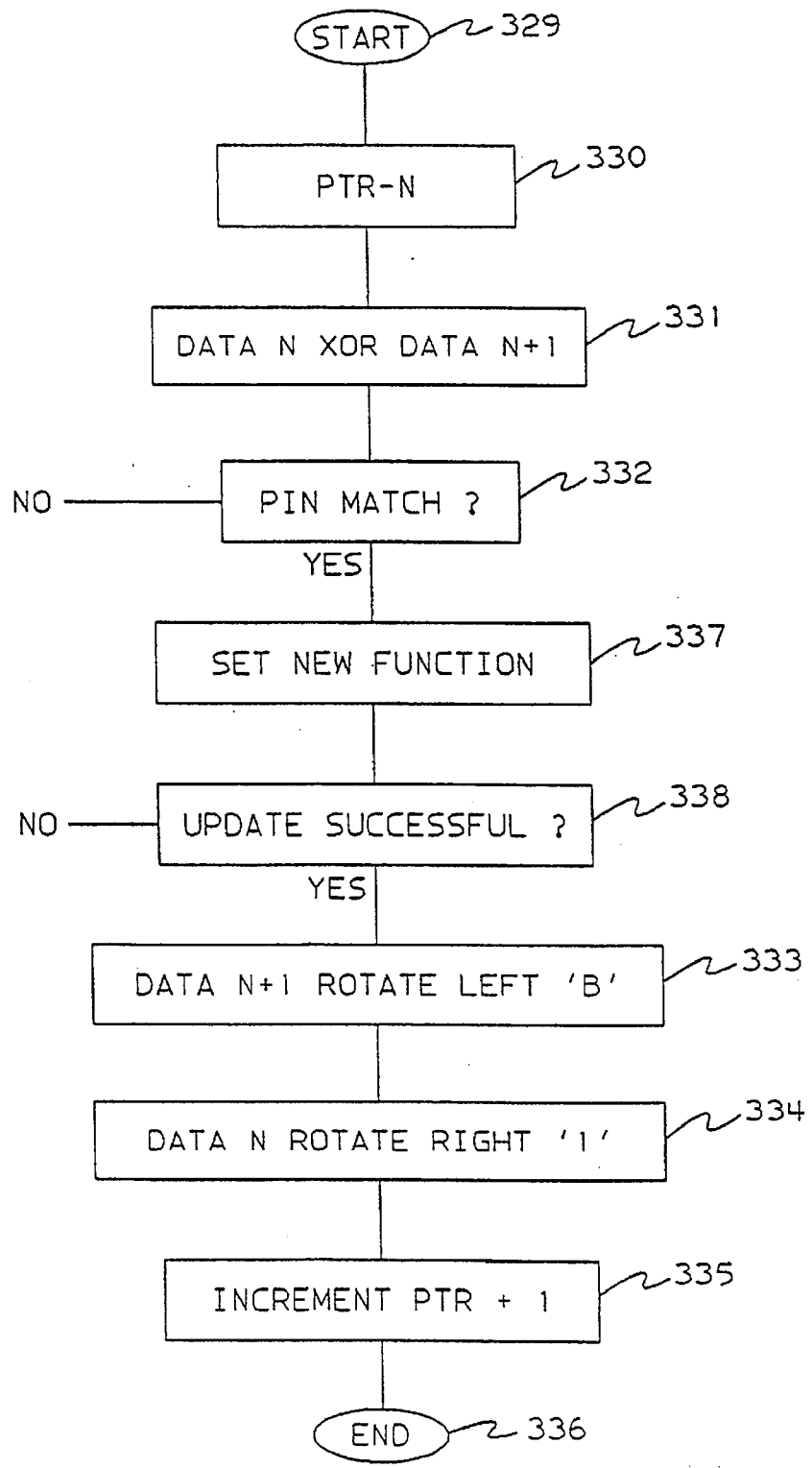
FIG. 12 shows an access generation/update flow diagram depicting the logical steps used in creating the new access code used for each functional update.

FIG. 12 shows a access generation/update flow diagram depicting the logical steps used in creating the new access code used for each functional update.

Turning now to our invention in greater detail, it will be seen from the description of the access code generator, that unique access codes can simultaniously generated in the controlling location manufacturing for instance and the computer system. The pseudo random nature of the resulting access code combined with hardware that restricts the number of invalid attempts to match the access code makes it unlikely that there could be a successful guess. This generator doesn't require expensive logic such as multipliers in its algorithm, which would be the case of the DES algorithm.

FIG. 8 illustrates our preferred embodiment in which there is a secure function transmitter 301 remote to the computer system 302. The function transmitter is kept in a secure area and its purpose is to keep track of the present PIN number of each computer system by maintaining a file that is related to the serial number of the computer system. At any time, a new function can be set into the computer system by matching the PIN number generated in the transmitter with the PIN number similarly created in the computer system in this case within the processor 305. The new function control being set into function 308 registers within the processor system.

FIG. 9 depicts how the secure function transmitter might operate on secure file data 310 and key entry data 311 to manage nonvolatile storage 313 with a PIN generator 314 to send a unique PIN and function 315 to a remote computer system 316.

FIG. 10 shows the matching logic in the computer system that generates unique pins 320 with it's nonvolatile and secure data file 319 to compare the incomming PIN before permitting the function register 321 to be updated. Not shown here is the hardware security and access try limit logic described in the referenced invention.

FIG. 11 shows how the access code generators in both the computer system and transmitter interract. The components are the non-volatile secure data fields 1-N 325 where "N" is an integer >2, a vector that addresses Data field "N", the operator 327 which is a set of logic that operates on the data fields 325, Pointer 326 and produces an access code 328 or "PIN".

FIG. 12 describes the access code generation algorithm. The pointer 330 points to data field "N". The Data from data field "N" is exclusive or'd with the data from data field "N+1 at block" 331, The result of the exclusive or is the PIN. If the PIN matches the incoming PIN at block 332, the new function is set into the function register at block 337 and then after determining if the update is successful at step 338, the data field "N+1" is rotated left by "B" at step 33 where B is an a field from data field "N" the high 3 bits for instance. Next the Data field "n" is rotated right 1 position at 335 and finally, the pointer is at step 334 incremented by 1 at step 336.

While preferred embodiments of the invention have been described above, it will be understood that those skilled in the art, may make various improvements and enhancements which fall within the scope of the claims which follow. These claims should be construed to maintain the proper protection for the invention first disclosed.

What is claimed is:

1. A method for altering the parameters of a data processing system, comprising the steps of:

entering an access number to a secure portion of said data processing system;

transmitting unique identification information and a function code to said data processing system, said function code defining parameters of said data processing system, said step of transmitting being able to be performed a predetermined number of times when said unique identification information does not match said access number; and comparing said unique identification information signal with said access number; and if there is a match between said unique identification information and said access number and said match occurs prior to said predetermined number of times, parameters of said system are altered based on said function code.

2. A method, as recited in claim 1, wherein said unique identification information is transmitted using means selected from the group consisting of a keyboard, direct access storage devices and telecommunications link.

3. A method, as recited in claim 2, wherein said secure portion of said data processing system is a secure access control register.

4. A method, as recited in claim 3, wherein said data processing system includes a locally accessable computer system which includes a processor, a memory, means for altering parameters of said locally accessed computer system, and an I/O port.

5. A method, as recited in claim 3, wherein said access number is generated by a secure remote access number generator.

6. A method, as recited in claim 5, further comprising the step of:

transmitting a generated security signal through a data link of said data processing system, said security signal being generated by said secure remote access number generator.

7. A method, as recited in claim 6, wherein said secure remote access number generator further includes a nonvolatile data area for storing identification information, a unique identification information generator and a function control register.

8. A method, as recited in claim 6, Wherein said non-volatile data area includes a plurality of N data fields, a pointer to the Nth data field, and an operator responsible for managing the data fields and for generating new identification information to be used for altering the parameters of the locally accessable computer system.

9. A method, as recited in claim 8, further comprising the step of:

enabling a selected subset of parameters of said locally accessable computer system from a predetermined set of parameters, said enabling being invoked each time said identification information matches a state of multibit alterable code within said non-volatile storage area.

10. A method, as recited in claim 9, further comprising the step of:

selectively altering said multibit alterable code, wherein, based on said multibit alterable code, said enabling invokes an alternate subset of said set of parameters each time power is applied to said data processing system.

11. A method, as recited in claim 10, wherein said multibit alterable code includes a unique identification code.

12. A method, as recited in claim 11, wherein said step of selectively altering said multibit alterable code comprises entering of an identification code and thereafter altering said multibit alterable code only in response to a match between said entered identification code and said unique identification code within said multibit alterable code.

13. A method, as recited in claim 12, further including the steps of:

initially storing said multibit alterable code within said physically secure nonvolatile storage device via a physically alterable electronic link; and destroying said physically alterable electronic link after said initial storing of said multibit alterable code.

14. A method, as recited in claim 13, further including the step of:

storing said unique identification code at a central control facility where said remote access code generator is located.

15. A method, as recited in claim 15, wherein a particular subset of said predetermined set of parameters comprises a valid memory address range within said memory within said data processing system.

16. A method, as recited in claims 15, further including the step of:

limiting a user of said data processing system to access within said valid memory address range in response to said enabling of said particular subset of said predetermined set of parameters.

17. A method, as recited in claim 3, wherein said comparing occurs within said secure access control register of said locally accessed computer system.

18. A method for altering parameters of a data processing system, the data processing system comprising a locally addressable computer system, said locally addressable computer system including a secure access control register, said method comprising the steps of:

first entering an access number to said secure access control register within said locally accessable computer system, said step of transmitting being able to be performed a predetermined number of times when said unique identification information does not match said access number;

second transmitting a unique identification and a function code, said function code defining parameters of said locally accessable computer system;

comparing said unique identification information with said access number within said locally accessable computer system; and if there is a match between said transmitted identification information and said access number and said match occurs prior to said predetermined number of times, parameters of said locally accessable computer system are altered based on said function code.

19. A method, as recited in claim 18, wherein said locally accessable computer system which includes a processor, a memory, means for altering parameters of said locally accessed computer system, and an I/O port.

20. A method, as recited in claim 19, wherein said access number is generated by a secure remote access number generator.

21. A method, as recited in claim 20, wherein said secure remote access number generator further includes a nonvolatile data area for storing said identification information, a unique identification information generator and a function control register.

22. A method, as recited in claim 21, wherein said non-volatile data area includes a plurality of N data fields, a pointer to the Nth data field, and an operator responsible for managing the data fields and for generating new identification information to be used for altering the parameters of the locally accessable computer system.

23. A method, as recited in claim 22, further comprising the step of:

enabling a selected subset of parameters of said locally accessable computer system from a predetermined set of parameters, said enabling being invoked each time said identification information matches a state of multibit alterable code within said non-volatile storage area.

24. A method, as recited in claim 18, further comprising the step of:

transmitting a generated security signal through a data link of said data processing system.

25. A method, as recited in claim 18, wherein said comparing occurs within said secure access control register of said locally accessed computer system.

26. A method, as recited in claim 25, further comprising the step of:

selectively altering said multibit alterable code, wherein, based on said multibit alterable code, said enabling invokes an alternate subset of said set of parameters each time power is applied to said data processing system.

27. A method, as recited in claim 26 wherein said multibit alterable code includes a unique identification code.

28. A method, as recited in claim 27, wherein said step of selectively altering said multibit alterable code comprises entering of an identification code and thereafter altering said multibit alterable code only in response to a match between said entered identification code and said unique identification code within said multibit alterable code.

29. A method, as recited in claim 28, further including the steps of:

initially storing said multibit alterable code within said physically secure nonvolatile storage device via a physically alterable electronic link; and destroying said physically alterable electronic link after said initial storing of said multibit alterable code.

30. A method, as recited in claim 29, further including the step of:

storing said unique identification code at a central control facility where said remote access code generator is located.

31. A method, as recited in claim 28, wherein a particular subset of said predetermined set of parameters comprises a valid memory address range within said memory within said data processing system.

32. A method, as recited in claim 31, further including the step of:

limiting a user of said data processing system to access within said valid memory address range in response to said enabling of said particular subset of said predetermined set of parameters.

33. A method for altering the parameters of a computer system, comprising the steps of:

entering a unique identification code into a locally accessed computer system;

comparing said entered unique identification code to an alterable access number, said access number being stored in said locally accessed computer system;

obtaining the results of said comparing; and if there is a match between said entered unique identification code and said access number and said match occurs prior to reaching said predetermined number of times, the parameters of said locally accessed computer system are altered.

34. A method, as recited in claim 33, further comprising the steps of:

transmitting an access number to said locally accessed computer system, wherein said transmitting of said access number is prior to said entering of said unique identification code into said locally accessed computer system; and transmitting a function code along with said unique identification code, said function code defining parameters of said local accessed computer system.

35. A method, as recited in claim 34, wherein said parameters of said locally accessed computer system are altered based on said function code.

36. A method for altering the parameters of a data processing system, comprising the steps of:

entering an access code and an initial parameter code to a secure portion of said data processing system, said initial parameter code defining a plurality of parameters for said system;

entering an access attempt code to said system;

initializing an access attempt counter value to a zero value;

transmitting a unique identification signal and a function code to said system;

comparing said access attempt counter value to said access attempt code and, if said access attempt counter value is less than said access attempt code, performing the steps of:

I) comparing said unique identification information signal to said access code;

ii) altering a predetermining sub-plurality of said plurality of parameters based on said function code if there is a match between said unique identification information and said access number and, if there is not a match then incrementing said access counter value then iii) repeating said step of transmitting and said comparing said access attempt counter value to said access attempt code and, if said access attempt counter value is less than said access attempt code, performing the steps (I)–(iii).

* * * * *